(No Model.)
N. B. JOHNSON.
HARNESS SUPPORT.
No. 459,583. Patented Sept. 15, 1891.
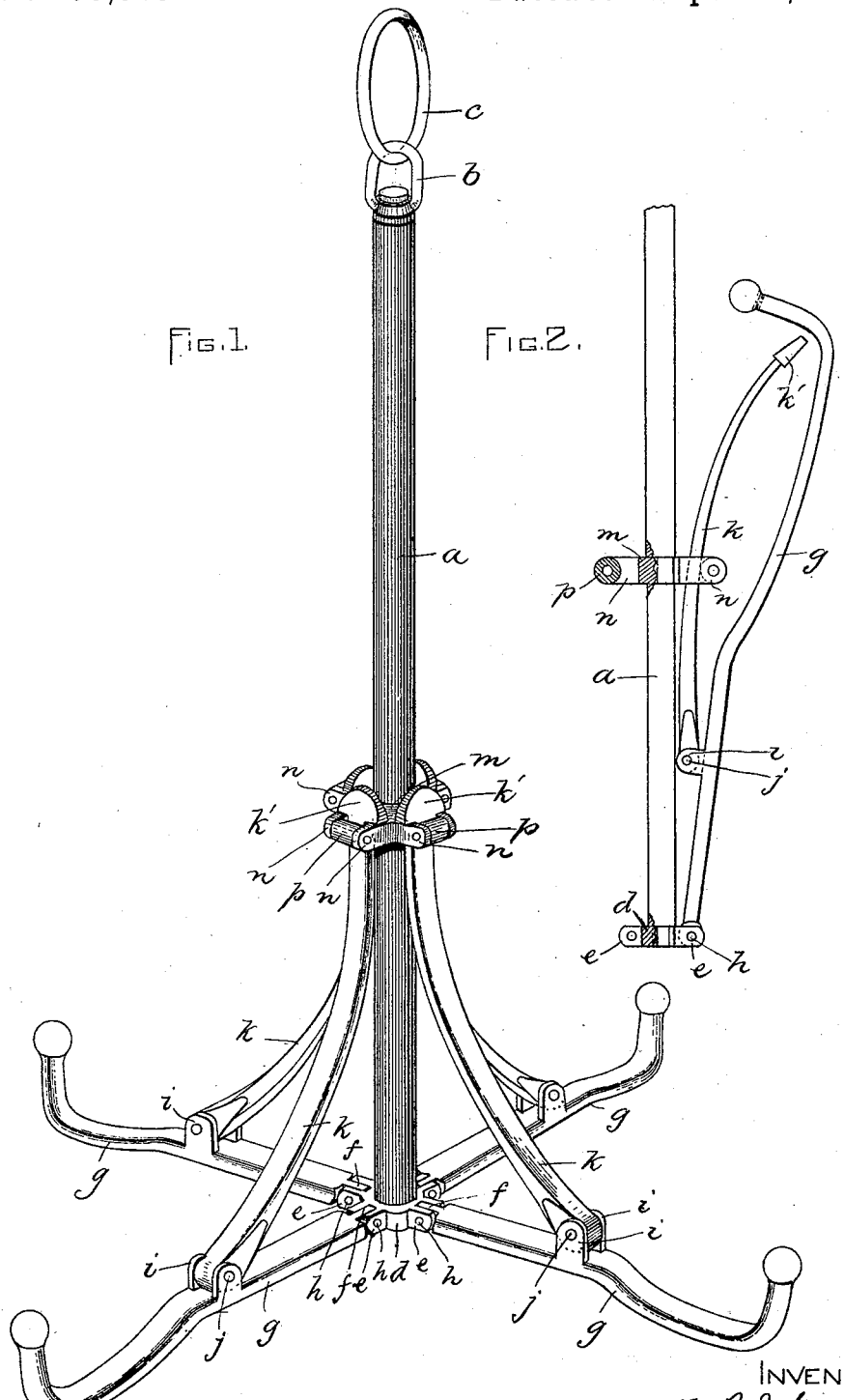
WITNESSES:
INVENTOR:

UNITED STATES PATENT OFFICE.

NAPOLEON B. JOHNSON, OF FRAMINGHAM, MASSACHUSETTS.

HARNESS-SUPPORT.

SPECIFICATION forming part of Letters Patent No. 459,583, dated September 15, 1891.

Application filed February 3, 1891. Serial No. 379,978. (No model.)

*To all whom it may concern:*

Be it known that I, NAPOLEON B. JOHNSON, of Framingham, in the county of Middlesex and State of Massachusetts, have invented certain new and useful Improvements in Harness-Supports, of which the following is a specification.

This invention has for its object to provide a simple, efficient, and useful device for hanging harness in stables, &c.; and it consists in the improved harness-support which I will now proceed to describe and claim.

In the accompanying drawings, forming a part of this specification, Figure 1 represents a perspective view of my improved harness-support. Fig. 2 represents a side elevation of a portion of the same, only one arm being shown and that one being shown folded up, portions of the central rod and encircling rings or collars thereon being broken away and shown in section.

The same letters indicate the same parts in both the figures.

In the drawings, $a$ represents the main or central rod of my improved harness-support. Said rod is preferably provided at its upper end with a swivel $b$, attached to a ring $c$, by which the support is adapted to be hung on a hook or other suitable support. The lower end of the rod $a$ is provided with a collar or ring $d$, which is affixed to said rod in any suitable manner. The ring or collar $d$ is provided with outstanding ears $e\ e\ e$, of which I have shown four pairs in Fig. 1. It is obvious, however, that any other number of pairs of said ears that may be found convenient may be employed.

Between each pair of ears $e\ e$ is inserted an ear $f$, formed on the end of an arm $g$, and said ears $f$ and $e\ e$ are connected by a pin $h$ in such a manner as to permit the arm $g$ to swing upon said pin as a pivot. The arms $g\ g$ are preferably turned up at their outer ends to form hooks adapted to retain the different parts of a harness hung thereon. As stated of the ears $e\ e$, there may be any suitable number of said arms, four being shown in Fig. 1. Each arm $g$ is provided with a pair of upstanding ears $i\ i$ upon its upper surface, between which is pivoted by a pin $j$ a brace or stay $k$. The said braces $k\ k$ have their upper ends widened and shouldered, as at $k'$, for a purpose hereinafter described.

The rod $a$ is provided at a suitable height above the ring or collar $d$ with another ring or collar $m$, which is firmly affixed to said rod in any suitable way. From this collar $m$ project pairs of ears $n$, there being the same number of pairs of ears $n$ on the collar $m$ as there are pairs of ears $e$ on the collar $d$, the collars $d$ and $m$ being so arranged that each pair of ears $n$ will be over a pair of ears $e$.

Journaled in each pair of ears $n\ n$ is a roller $p$, there being sufficient space between the inner side of the roller $p$ and the outer side of the collar $m$ to admit of the introduction of the brace $k$ therebetween. The brace $k$ passes between the ears $m\ m$ and inside of the roller $p$ journaled therein, and is of such length that when the arm $g$, to which said brace is attached, is in the position shown in Fig. 1, or substantially horizontal, the shoulders of the head of said brace will rest on the upper side of the ears $n\ n$, and the brace $k$ will thus be enabled to support the arm $g$ in the aforesaid position. In this position it will be seen that the device is adapted to support the different parts of a harness, and when the same is hung on the arms $g\ g\ g$ it is obvious that the support may be revolved, the swivel $b$ being provided for that purpose, while the user is polishing or working on different parts of the harness, each portion of the latter being easily brought into a convenient position to be operated upon.

When any arm of the support is not in use, it may be folded up, as shown in Fig. 2, the brace $k$ sliding upwardly, as shown. The lower part of the brace $k$ is preferably thickened, so as to give it a bearing on the roller $p$ and collar $m$, the frictional bearing thus given being sufficient to hold the brace $k$ and arm $g$ in the said folded position. It will thus be seen that when the support is not in use it is adapted to be folded up very compactly and to occupy very little space.

I claim—

1. A harness-support comprising a central rod, arms pivoted to the lower end of said rod, and braces pivotally connected to said arms and passing through guides or supports on the said central rod, said braces having widened or shouldered heads adapted to bear on said support and thus hold the said arms in a substantially horizontal position, as set forth.

2. A harness-support comprising a central rod, a swivel at one end thereof, arms pivoted to the lower end of said rod, braces pivotally attached to said arms and having widened or shouldered heads, a ring or collar $m$, affixed to the central rod and having pairs of offset ears $n$, and a roller $p$, journaled between each pair of ears $n$, each pair of ears and roller journaled therein inclosing one of the braces, the widened or shouldered heads of the braces being adapted to rest on said ears and thus support the arms in a substantially horizontal position, said braces being adapted to slide upwardly and thus fold up said arms, as set forth.

In testimony whereof I have signed my name to this specification, in the presence of two subscribing witnesses, this 29th day of January, A. D. 1891.

N. B. JOHNSON.

Witnesses:
C. F. BROWN,
A. D. HARRISON.